Jan. 14, 1969  R. ORTEGA  3,421,482

OUTDOOR SWIMMING POOL HEATER

Filed Jan. 19, 1967

ROBERT ORTEGA
INVENTOR.

KENDRICK, SUBKOW and STOLZY
BY
ATTORNEY

# United States Patent Office 3,421,482
Patented Jan. 14, 1969

3,421,482
OUTDOOR SWIMMING POOL HEATER
Robert Ortega, Huntington Beach, Calif., assignor to Anthony Pools, Inc., South Gate, Calif., a corporation of Delaware
Filed Jan. 19, 1967, Ser. No. 610,281
U.S. Cl. 122—264     12 Claims
Int. Cl. F22b *15/00;* F23j *11/00*

ABSTRACT OF THE DISCLOSURE

An outdoor swimming pool heater having an upper air chamber containing four diagonally positioned air spacers, a second air chamber connected to the upper air chamber and leading to an air passage contacting the burner chamber, a hole in the burner chamber through which air is drawn from the air passage, and a baffle within the burner chamber to direct the flow of incoming air to a level below that of the burner.

---

This invention relates to a heater for outdoor installation. More specifically, the invention pertains to an outdoor heater designed to heat water for a swimming pool.

Swimming pool heaters of the prior art have not been suitable in outdoor installations. On calm, clear days, they will function satisfactorily out of doors, however, under windy or rainy conditions, they function very poorly. Under such conditions, the turbulent incoming air provides combustion conditions which either substantially reduce the heating efficiency or extinguish the burner altogether.

As a result of these problems some communities require that a swimming pool heater be enclosed within a structure which houses and protects it from the elements. This, of course, increases the cost of constructing a heated swimming pool due to the added cost of erecting a separate housing for the pool heater. If a separate housing is not employed, the outdoor installation of a presently available swimming pool heater can result in increased heating costs due to inefficient combustion conditions within the heater.

In solving the problems of the prior art, I have provided an outdoor heater in which the air flows through a tortuous path to the gas burner from the air intake. This evens out the air flow to the burner and tends to eliminate turbulent air conditions in the region of the burner, even on stormy or windy days. Air spacer members are placed adjacent the air intake and are designed to dissipate the force of wind entering the air intake. This is conveniently accomplished by having the air intake open into an air intake chamber, with the air spacer members positioned within the air intake chamber so as to divide it into quarters, each of which communicates with the air intake and with the tortuous air path leading to the gas burner.

The tortuous air path leading to the gas burner may include an air passage which contacts the exterior of the heater chamber containing the gas burner and heat exchange means which are supplied with heat from the burner. Also, the tortuous air path may include an air chamber positioned between said air intake chamber and said air passage.

I preferably employ means associated with the air intake to prevent the entry of rain water into the tortuous air path to the gas burner. This may be accomplished by providing a rain lip adjacent the air intake which acts as a barrier to water entering the intake.

A specific embodiment of the invention is illustrated in the accompanying drawing in which like reference characters designate like parts in the several views thereof, wherein.

Figure 1:
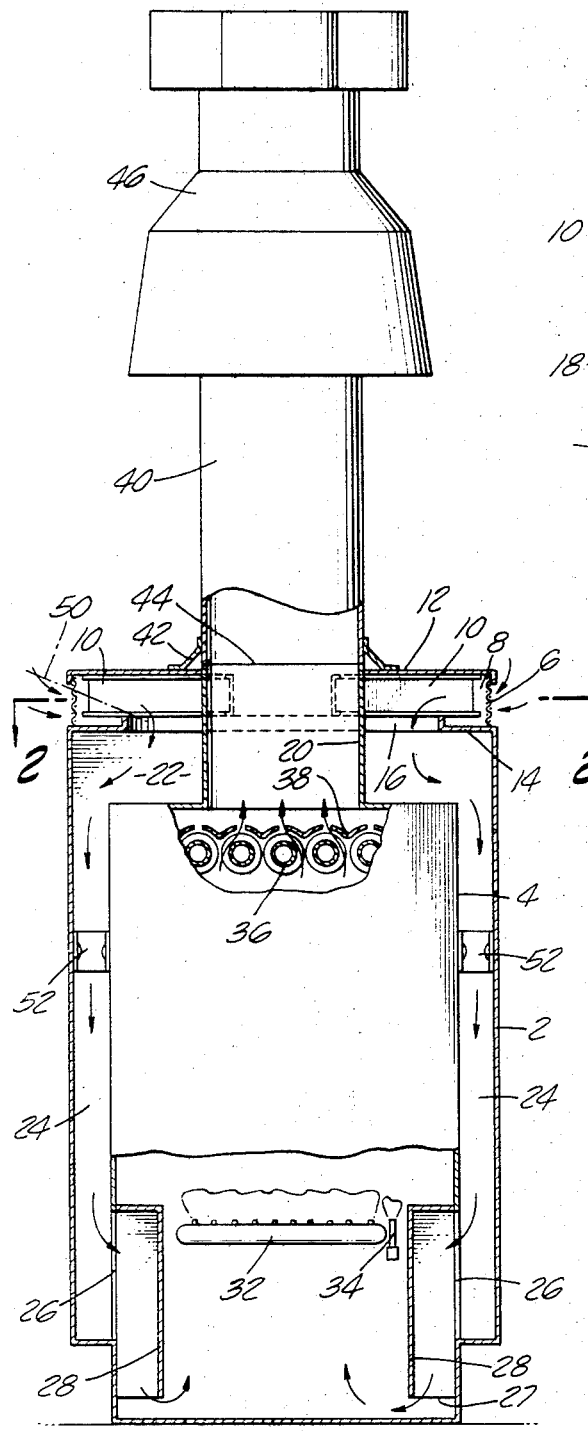
FIG. 1 is a partial front sectional view of an outdoor swimming pool heater or boiler showing in section the flow path of incoming air to the combustion zone.

As shown in FIG. 1, an inner shell 4 encloses a heater chamber which contains a conventional gas burner 32 and a pilot burner 34. Heated air and combustion products rise from the burner 32 into contact with a plurality of conventional finned heat exchanger tubes 36. Circulating water within tubes 36 receives heat through heat transfer from the combustion gases. In order to improve heat transfer, the tubes may have V-baffles positioned above them which force the combustion gases to traverse a curved path around the tubes, thereby improving the contact between the tube and fin surfaces and the heated gases. The surface of the shell 4 is generally insulated to reduce heat losses.

Figure 2:
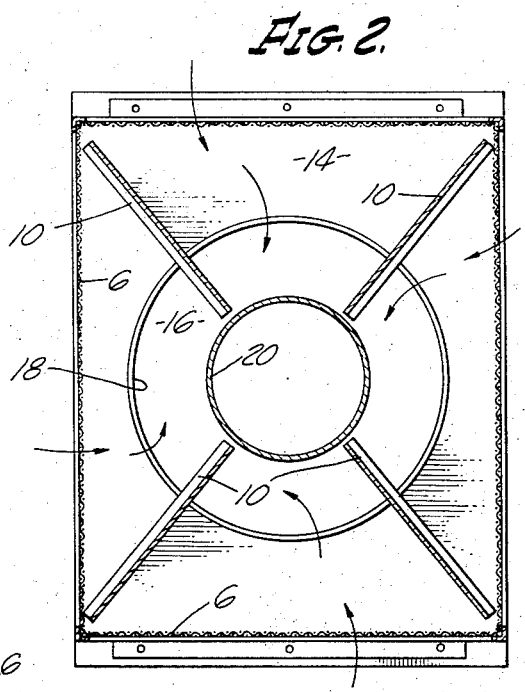
FIG. 2 is a cross sectional view of the air intake chamber taken on the line 2—2 of FIG. 1.

Incoming air enters through a screen 6 which prevents the entry of insects, leaves and airborne debris. The screen 6 encloses a first air chamber or air intake chamber 8 having a top member 12 and bottom member 14. Positioned within air chamber 8 are four spacers 10. As shown in FIG. 2, the spacers 10 extend diagonally from the corners of chamber 8 toward its center to divide the chamber into generally pie-shaped quarters. The number of spacers 10 can be varied in constructing a heater according to the present invention. However, I have found the use of four spacers to be quite effective in breaking up or dissipating the force of wind entering air chamber 8 from any direction.

Centrally located in the member 14 is a hole 16 encircled by an upstanding rain lip 18. A flue 20 passes centrally through hole 16 and is joined at its bottom to the inner shell 4. The upper end of flue 20 passes through a hole in member 12 to terminate at an edge 44. An annular opening between hole 16 and the exterior of flue 20 connects the first air chamber 8 with a second air chamber 22. On passing into second air chamber 22, the air is heated to some extent through contact with the surface of the flue 20 and the surface of the inner shell 4.

The second air chamber 22 communicates with an air passage 24 surrounding the inner shell 4 and formed in the space between the inner shell 4 and an outer shell 2. A number of brace members 52, two of which are shown in FIG. 1, support inner shell 4 in a spaced relation with respect to the outer shell 2. Within air passage 24, the air moves downwardly where it is heated to some extent through contact with inner shell 4.

A pair of openings 26 are provided near the bottom of inner shell 4 which connect the interior of shell 4 with air passage 24. A pair of baffles 28 within the inner shell are spaced inwardly from openings 26, and open at their bottoms 27 to allow incoming air to enter the combustion zone 30 at a region beneath the burner 32 from whence it rises into contact with burner 32 as described previously.

A chimney 40 is held by an annular bracket 42 in contact with flue 20. A conventional vent cap 46 encloses the upper end of the chimney to allow the exit of combustion gases while preventing the entry of wind or rain into the chimney.

Figure 3:
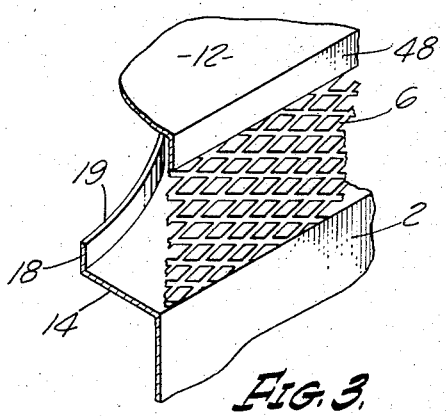
FIG. 3 is a broken away detail view of the air screen illustrating means for preventing entry of rain water into the heater interior.

As shown in FIG. 3, a downwardly depending lip 48 from member 12 encloses the upper portion of screen 6. Lip 48 and upstanding lip 18 are placed so as to cooperate in preventing the entrance of rain water into the passages within the heater. An entry angle as shown at line 50 in FIG. 1 will be required in order for rain to clear the upper edge 19 of lip 18. Water which does not clear lip 18 gathers on the upper surface of member 14 where it is retained by lip 18 and is free to run off through screen 6. The placement and size of lips 18 and 48 can be varied so long as an entry angle is provided which prevents entrance of rain water within the interior of the heater.

A swimming pool heater, as illustrated in the preferred embodiment of my invention, has been built and subjected to rigorous testing according to standards set by the American Gas Association. The heater performed satisfactorily when subjected to simulated rainstorm, and it operated satisfactorily under a variety of simulated wind conditions. In one particularly severe test, the heater was positioned on a platform in a wind tunnel and turned at various angles while subjected to a wind velocity of 40 miles per hour. As required by the test, the main burner and pilot were not extinguished and the main burner ignited from the pilot burner without excessive delay.

It will be apparent that the size of air passages within my heater, the height of the chimney employed, etc. are all design factors which affect the heater's combustion efficiency. These factors may be varied, as desired, in the practice of my invention, to provide an adequate but not excessive quantity of air for combustion.

In the tests performed on my heater, it was found that the use of air spacers 10 was quite important in breaking up or dissipating the force of wind entering the air chamber 8. When the spacers are absent, the resulting air movement within the heater created unsatisfactory combustion conditions. In my preferred embodiment, the manner in which the spacers 10 direct incoming air into the annular opening enclosing the flue 20 is shown in FIG. 2.

The term heater has been used throughout this specification in a generic sense to also include boilers. The distinction between boilers and heaters relates to the pressure of the liquid being heated and the heating efficiencies. The device which was built and tested, as described previously, is in technical terms a boiler.

The foregoing description of a preferred embodiment of my invention is for purposes only of illustration. This description should not be construed as a limitation of my invention as defined in the following claims.

What is claimed:

1. An outdoor heater comprising: a heater chamber; a gas burner and heat exchange means contained within said chamber; a shell having a hole in its upper surface and spaced from said heater chamber to define an air passage therebewteen; a top surface member positioned above said shell and defining a first air chamber bounded by said top surface member and the upper outer surface of said shell; screen means enclosing said first air chamber; a second air chamber communicating with said air passage, said second air chamber defined by the upper inner surface of said shell and the upper outer surface of said heater chamber; a flue extending upwardly from said heater chamber and passing centrally through said hole in spaced relation thereto to define an opening between the exterior of said flue and said hole, said opening connecting said first and second air chambers; an opening in the bottom portion of said heater chamber connecting said chamber with said air passage, a baffle positioned within said heater chamber adjacent the opening to said air passage and adapted to force incoming air to a level below the level of said burner, and a plurality of air spacer members positioned with said first air chamber and adapted to dissipate the force of wind entering through said screen means.

2. The heater of claim 1, wherein said hole in the upper surface of the shell is enclosed within an upstanding rain lip, which is adapted to prevent the entrance of rain water into said hole.

3. The heater of claim 2, including a downwardly directed outer lip on said top surface member, the size and placement of said outer lip and said rain lip being such that they cooperate to prevent the entrance of rain water into said hole.

4. The heater of claim 1, wherein said air spacer members are positioned to divide said first air chamber into quarters, each of said quarters communicating with said screen means and each of said quarters communicating with the opening to said second air chamber.

5. The heater of claim 4, wherein said first air chamber is generally rectangular in cross section and each of said air spacer members extends diagonally from a corner of said air chamber toward its center.

6. An outdoor heater comprising: heat exchanger means; a burner adapted to supply heat to said heat exchanger means; an air intake having open sides to receive incoming air, said air intake opening into an air chamber and said air intake positioned above said heat exchanger means and said burner; a tortuous air path leading downwardly from said air intake to said burner; air spacer members positioned adjacent said air intake, said spacer members positioned angularly with respect to said open sides of said air intake to dissipate the force of wind entering said intake, and said spacer members dividing said air chamber into separate portions, each of said portions communicating with said air intake and with said tortuous air path.

7. The heater of claim 6, wherein said air intake is open on all sides and said air spacer members divide said air chamber into quarters, each of said quarters communicating with an open side of said air intake and with said tortuous air path.

8. The heater of claim 6, including means associated with said air intake to prevent the entrance of rain into said tortuous air path.

9. The heater of claim 6, including: a heater chamber containing said burner; said tortuous air path including an air passage in contact with the exterior of said heater chamber, and an opening in said heater chamber communicating with said air passage, said opening positioned to direct entering air into a region beneath said burner.

10. The heater of claim 9 wherein said tortuous air path includes an air chamber positioned between said air passage and said air intake.

11. An outdoor heater comprising: an air intake; heat exchanger means; a gas burner adapted to supply heat to said heat exchanger means; a tortuous air path from said air intake to said gas burner; air spacer members adjacent said air intake, said spacer members positioned to dissipate the force of wind entering said intake; said air intake opening into an air chamber, and said air spacer members positioned within said air chamber to divide it into quarters, each of said quarters communicating with said air intake and with said tortuous air path.

12. An outdoor heater comprising: heat exchanger means; a burner adapted to supply heat to said heat exchanger means; an air intake having open sides to receive incoming air, said air intake positioned above said heat exchanger means and said burner; said burner contained in a heater chamber; a tortuous air path leading downwardly from said air intake to said burner, said air path including an air passage in contact with the exterior of said heater chamber and an air chamber positioned between said air passage and said air intake, an opening in said heater chamber communicating with said air passage, said opening positioned to direct air into a region beneath said burner, and a baffle positioned within said heater chamber adjacent said opening and adapted to contact air entering through said opening.

References Cited

UNITED STATES PATENTS

| | | |
|---|---|---|
| 2,007,230 | 7/1935 | Wade. |
| 2,764,972 | 10/1956 | Ryder _____ 126—307 |
| 2,818,060 | 12/1957 | Field _____ 126—307 |
| 3,082,758 | 3/1963 | Heiman _____ 126—307 X |

FREDERICK L. MATTESON, Jr., *Primary Examiner.*

EDWARD G. FAVORS, *Assistant Examiner.*

U.S. Cl. X.R.

126—307